(12) United States Patent
Mizuta et al.

(10) Patent No.: US 10,024,278 B2
(45) Date of Patent: Jul. 17, 2018

(54) FRONT STRUCTURE OF SADDLE RIDE TYPE VEHICLE

(71) Applicant: HONDA MOTOR CO., LTD., Tokyo (JP)

(72) Inventors: Koji Mizuta, Wako (JP); Yoshinori Korogi, Wako (JP); Yukitou Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/466,440

(22) Filed: Mar. 22, 2017

(65) Prior Publication Data

US 2017/0276104 A1    Sep. 28, 2017

(30) Foreign Application Priority Data

Mar. 24, 2016  (JP) ................. 2016-060892

(51) Int. Cl.
| | |
|---|---|
| *B60K 11/00* | (2006.01) |
| *F02M 35/10* | (2006.01) |
| *B60Q 1/04* | (2006.01) |
| *B62J 6/02* | (2006.01) |
| *B62J 17/02* | (2006.01) |
| *F02M 35/02* | (2006.01) |
| *B62D 35/00* | (2006.01) |

(52) U.S. Cl.
CPC ..... *F02M 35/10262* (2013.01); *B60Q 1/0408* (2013.01); *B62J 6/02* (2013.01);
(Continued)

(58) Field of Classification Search
CPC ... B62J 17/00; B62J 17/02; B62J 17/04; B62J 17/06; F02M 35/162; F02M 35/10013;
(Continued)

(56) References Cited

U.S. PATENT DOCUMENTS 7,399,029 B2 *  7/2008  Takeshita ................. B62J 17/00
                                                    180/309
8,006,791 B2 *  8/2011  Nakagome ............... B62J 17/02
                                                    180/219
(Continued)

FOREIGN PATENT DOCUMENTS

EP    2 106 991 B1    9/2014
EP    2 106 992 B1    9/2014
(Continued)

OTHER PUBLICATIONS

Extended European Search Report, dated Jul. 25, 2017, for European application No. 17161736.8.
(Continued)

*Primary Examiner* — John D Walters
*Assistant Examiner* — James J Triggs
(74) *Attorney, Agent, or Firm* — Birch, Stewart, Kolasch & Birch, LLP (57) ABSTRACT

A front structure of a saddle ride type vehicle includes a headlight unit, a front cowl, and a middle cowl. At a position outside the headlight unit in the vehicle width direction, an air intake portion opening to the front side of the vehicle is formed between the front cowl and the middle cowl. The front cowl includes a partition wall configured to divide the air intake portion into an upper region and a lower region. The lower region forms an inlet of an air intake path of an air cleaner. The upper region forms a first wind guide path configured to discharge a traveling wind to the rear side of the front cowl.

6 Claims, 10 Drawing Sheets

(52) U.S. Cl.
CPC .............. *B62J 17/02* (2013.01); *F02M 35/02* (2013.01); *F02M 35/1015* (2013.01); *B62D 35/005* (2013.01)

(58) Field of Classification Search
CPC .. F02M 35/10262; B62K 11/00; B62K 11/08; B62K 37/00; B62K 13/02; B62K 13/16; F01P 2050/16
See application file for complete search history.

(56) References Cited

U.S. PATENT DOCUMENTS

| | | | |
|---|---|---|---|
| 8,936,123 B2 | 1/2015 | Kogo et al. | |
| 2007/0024089 A1* | 2/2007 | Takeshita | B62J 17/02 296/192 |
| 2007/0149105 A1* | 6/2007 | Nakagome | B62J 17/02 454/136 |
| 2013/0249239 A1 | 9/2013 | Yokouchi et al. | |
| 2014/0092613 A1 | 4/2014 | Maeda et al. | |
| 2014/0202782 A1 | 7/2014 | Tsukui | |

FOREIGN PATENT DOCUMENTS

| | | |
|---|---|---|
| EP | 2 692 618 B1 | 10/2015 |
| JP | 2009-262913 A | 11/2009 |
| JP | 2010-42755 A | 2/2010 |
| JP | 2014-028588 A | 2/2014 |
| JP | 2014-065464 A | 4/2014 |
| JP | 2014-139029 A | 7/2014 |

OTHER PUBLICATIONS

Japanese Office Action for Application No. 2016-060892, dated Sep. 11, 2017, with English language translation.

* cited by examiner

FRONT STRUCTURE OF SADDLE RIDE TYPE VEHICLE

BACKGROUND OF THE INVENTION

Field of the Invention

The present invention relates to the front structure of a saddle ride type vehicle.

Description of the Related Art

As a structure for improving the air intake performance of an engine in a saddle ride type vehicle, there is proposed a structure that provides an air intake portion on the periphery of the front cowl of a vehicle and efficiently guides a traveling wind to the air intake path of an air cleaner (for example, Japanese Patent Laid-Open No. 2010-42755).

In a saddle ride type vehicle with a front cowl, the comfort for a rider can be improved by a windbreak effect. On the other hand, a negative pressure is generated behind the wind screen in some cases. As a considerable countermeasure, a wind guide path configured to guide the traveling wind to the rear side of the wind screen is provided on the periphery of the front cowl. However, if the wind guide path is provided in addition to the air intake portion, the structure on the periphery of the front cowl becomes complex.

SUMMARY OF THE INVENTION

It is an object of the present invention to guide a traveling wind to the rear side of an air cleaner or a front cowl by a relatively simple structure.

According to an aspect of the present invention, there is provided a front structure of a saddle ride type vehicle, comprising: a headlight unit; a front cowl including a portion configured to surround the headlight unit in a front view of the vehicle; and a middle cowl configured to cover a side of the headlight unit, wherein at a position outside the headlight unit in a vehicle width direction, an air intake portion opening to a front side of the vehicle is formed between the front cowl and the middle cowl, the front cowl comprises a partition wall configured to divide the air intake portion into an upper region and a lower region, the lower region forms an inlet of an air intake path of an air cleaner, and the upper region forms a first wind guide path configured to discharge a traveling wind to a rear side of the front cowl.

Further features of the present invention will become apparent from the following description of exemplary embodiments (with reference to the attached drawings).

DESCRIPTION OF THE EMBODIMENTS

An embodiment of the present invention will be described with reference to the accompanying drawings. In the drawings, arrows X and Y indicate horizontal directions orthogonal to each other, and an arrow Z indicates a vertical direction. In the following explanation, the vehicle driving direction is set to the X direction, and front and rear sides are defined based on the X direction that is the front-and-rear direction. In addition, the vehicle width direction is set to the Y direction, and left and right sides are defined based on the Y direction that is the left-and-right direction with respect to the vehicle driving direction.

<Outline>

Figure 1:
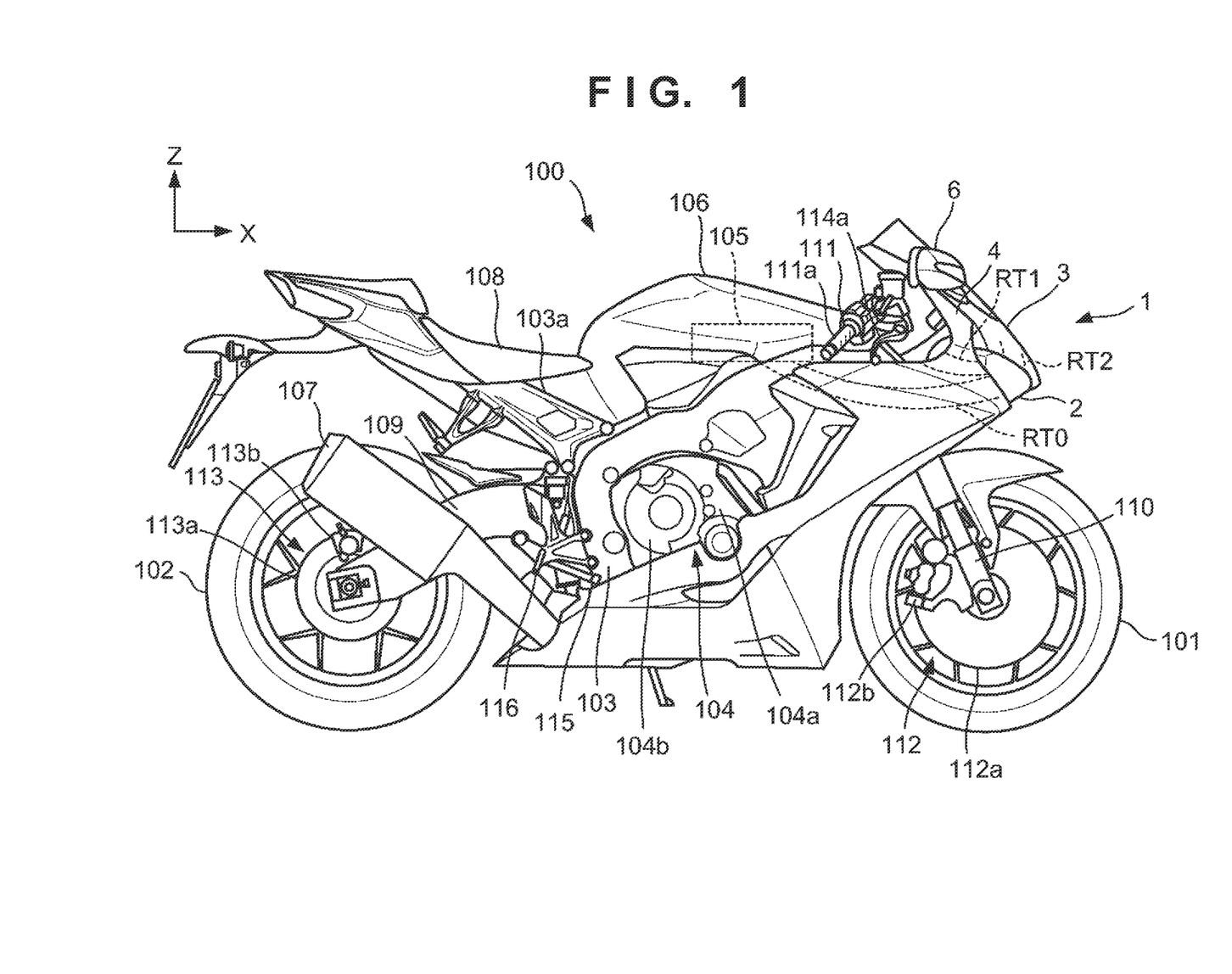
FIG. 1 is a side view of a vehicle according to an embodiment of the present invention.
Figure 2:
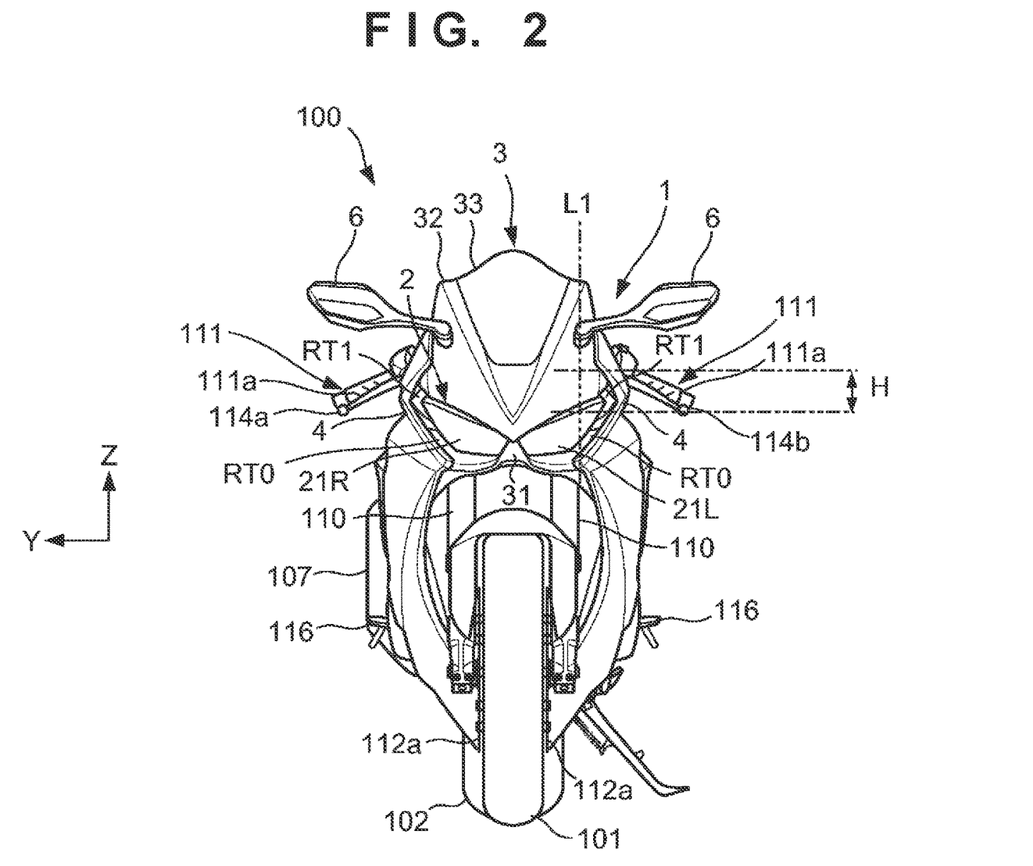
FIG. 2 is a front view of the vehicle shown in FIG. 1.

FIG. 1 is a side view (right side view) of a saddle ride type vehicle 100 according to an embodiment of the present invention. FIG. 2 is a front view of the vehicle 100, which shows the outline of the vehicle 100. FIGS. 1 and 2 are side and front views, respectively, showing a state in which the vehicle 100 stands in a vertical posture. The vehicle 100 according to this embodiment exemplifies a motorcycle including a front wheel 101 and a rear wheel 102. However, the present invention is also applicable to a saddle ride type vehicle of another form.

The vehicle 100 includes a vehicle body frame 103 that is the framework of the vehicle. A power unit 104 configured to drive the rear wheel 102 is supported by the vehicle body frame 103. The power unit 104 includes an engine 104a (for example, a multiple cylinder 4-cycle engine) and a transmission 104b that transmits the output of the engine 104a with changing gears. The output of the transmission 104b is transmitted to the rear wheel 102 by a chain transmission mechanism.

The air intake portion of the engine 104a opens to an air cleaner box 105 in which an air cleaner is disposed, and draws air filtered by the air cleaner. The air cleaner box 105 is formed in a detachable fuel tank cover 106. An air intake path RT0 configured to draw air from the front side of the vehicle 100 communicates with the air cleaner box 105. A combustion gas discharged from the exhaust portion of the engine 104a is exhausted from a muffler 107.

A seat frame 103a supporting a seat 108 on which a rider sits is connected to the rear portion of the vehicle body frame 103. A swing arm 109 is swingably supported by the rear portion of the vehicle body frame 103. The rear wheel 102 is rotatably supported by the swing arm 109.

A head pipe is provided on the front portion of the vehicle body frame 103. A pair of front forks 110 are steerably supported by the head pipe. The front wheel 101 is rotatably supported by the pair of front forks 110. Left and right separate handles 111 configured to steer the front wheel 101 are provided at the upper ends of the pair of front forks 110. Each handle 111 includes a grip 111a to be gripped by the rider. The left and right handles 111 are arranged to slant downward toward the outside in the vehicle width direction in the front view of the vehicle. This arrangement allows the rider to easily ride in a forward leaning posture.

The vehicle 100 includes braking devices 112 and 113. The braking device 112 is a braking device for the front wheel 101, and includes brake discs 112a provided on the front wheel 101, and a brake caliper 112b supported by the front fork 110. The handle 111 on the right side is provided with a brake lever 114a that operates the brake caliper 112b. The handle 111 on the left side is provided with a clutch lever 114b that operates the clutch of the transmission 104b.

The braking device 113 is a braking device for the rear wheel 102, and includes brake discs 113a provided on the rear wheel 102, and a brake caliper 113b supported by the swing arm 109. A brake pedal 115 that operates the brake caliper 113b is provided on the right side portion of the vehicle 100. Steps 116 on which the rider puts the feet are provided on the left and right side portions of the vehicle 100. The brake pedal 115 is arranged near the step 116 on the right side, and a shift pedal (not shown) is arranged near the step 116 on the left side.

<Front Structure>

Figure 3:
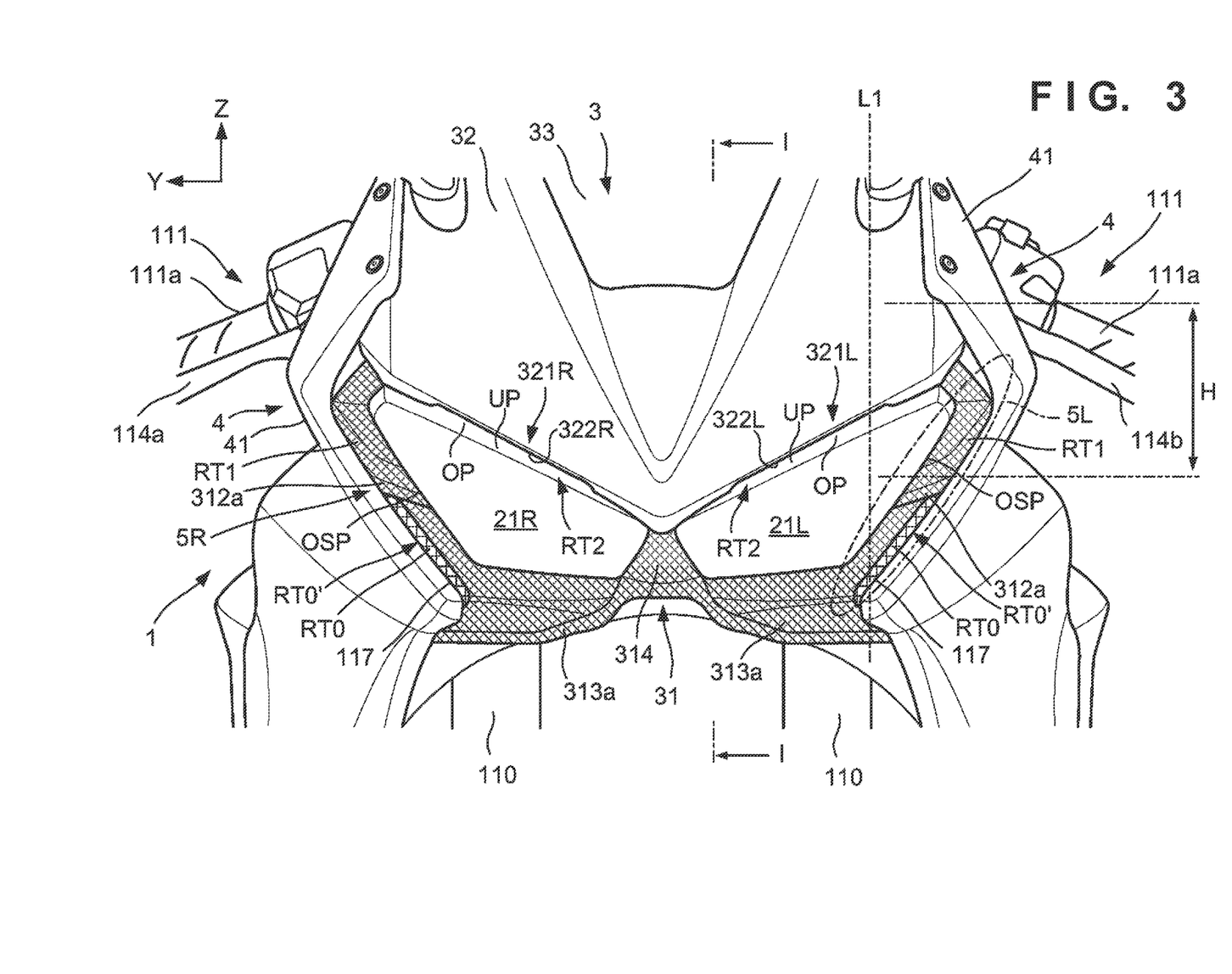
FIG. 3 is a partially enlarged front view of the vehicle shown in FIG. 1.

A front structure 1 of the vehicle 100 will be described next with reference to FIG. 3 in addition to FIGS. 1 and 2. FIG. 3 is a partially enlarged front view of the vehicle 100 in the front view of FIG. 2. Several parts (an annular member 31 and air intake ducts 117) are hatched for the purpose of clearly showing the boundaries to other parts.

The vehicle 100 is a full cowl motorcycle. The front structure 1 includes a headlight unit 2, a front cowl 3, and left and right middle cowls 4. The headlight unit 2 is a lighting device configured to illuminate the front side of the vehicle 100. The headlight unit 2 is a twin-lens unit including lens portions 21R and 21L on the right and left sides. The lens portions 21R and 21L have bilaterally symmetrical shapes but may have a different shape. The headlight unit 2 may be a single-lens unit including one lens unit.

The front cowl 3 includes the annular cowl 31, an upper cowl 32, and a transparent wind screen 33, and provides a windbreak effect against a traveling wind while ensuring the front visibility of the rider. The front cowl 3 is configured to divide and surround the lens portions 21R and 21L of the headlight unit 2 by the annular cowl 31 and the upper cowl 32 in the front view of the vehicle, and visually makes the outline of the lens portions 21R and 21L clearer. The wind screen 33 is connected to the upper portion of the upper cowl 32 and configured to allow the rider riding in a forward leaning posture to readily locate the head behind the wind screen 33 at the time of driving. Side mirrors 6 are fixed on the left and right side portions of the upper portion of the upper cowl 32.

Each middle cowl 4 is configured to cover a side of the headlight unit 2. The middle cowls 4 may be integrated with the front cowl 3. In this embodiment, however, the middle cowls 4 are formed as separate members, and the upper portions of the middle cowls 4 are fixed to the upper cowl 32. When the front cowl 3 and the middle cowls 4 are separated, molds used to form the parts can be made compact. The middle cowls 4 include an outer panel 41 that forms the exterior and an inner panel 42 (shown in FIG. 5) arranged inside the outer panel 41, and has such a shape that the central portion in the vertical direction in the front view of the vehicle projects outward in the vehicle width direction as a whole.

Air intake portions 5R and 5L opening in front of the vehicle 100 are formed between the front cowl 3 and the middle cowls 4 at positions outside the headlight unit 2 in the vehicle width direction. The air intake portion 5R is located on the right side of the headlight unit 2, and the air intake portion 5L is located on the left side of the headlight unit 2. One air intake portion may suffice. However, if the pair of air intake portions 5R and 5L are provided on the right and left sides, a traveling wind can be taken in more efficiently in balance on the right and left sides.

Each of the air intake portions 5R and 5L is divided into an upper region and a lower region by a partition wall 312a provided on the front cowl 3. The lower region forms an inlet RT0' of the wind guide path RT0 communicating with the air cleaner box 105. When the air to the engine 104a is taken in from the front side of the vehicle 100 by the wind guide path RT0, the air intake efficiency can be improved. The upper region forms a wind guide path RT1 that discharges the traveling wind to the rear side of the front cowl 3. The wind guide paths RT1 guide the traveling wind to the rear side of the front cowl 3, thereby suppressing negative pressure generation behind the front cowl 3 upon driving. In addition, since the area of the front cowl 3 in the front view is made small, a driving resistance generated by the traveling wind can be reduced.

In this embodiment, the wind guide paths RT1 are located outside the front forks 110 in the vehicle width direction in the front view of the vehicle. A line L1 indicates a position outside the outline of the front fork 110. Of the traveling wind and received by the front cowl 3, the traveling wind outside in the vehicle width direction readily flows backward from the wind guide paths RT1. Of the air resistance that the front cowl 3 receives due to the traveling wind, the air resistance at a portion outside in the vehicle width direction may be reduced to improve handling.

In this embodiment, the wind guide paths RT1 include portions included in a width H in the height direction of the left and right handle grips 111a in the front view of the vehicle, and are located close to the center of the vehicle 100 in the vehicle width direction with respect to the left and right handle grips 111a. The traveling wind and passing through the wind guide paths RT1 is discharged near the head of the rider who rides in the forward leaning posture. This facilitates suppressing of negative pressure generation near the head of the rider and also facilitates hearing of intake sound (to be described later). From this viewpoint, it is advantageous to set the outlets of the wind guide paths RT1 near the head of the rider. It is preferable to include the positions of the outlets of the wind guide paths RT1 in the front view of the vehicle within the width H in the height direction and locate the wind guide paths RT1 close to the center of the vehicle 100 in the vehicle width direction with respect to the left and right handle grips 111a. When the wind guide paths RT1 are arranged at such positions, the front cowl 3 and the like are fitted inside the handle grips 111a, and the protection performance of the front cowl 3 and the like at the time of a fall or the like can be improved.

Wind guide paths RT2 are formed between the headlight unit 2 and the upper cowl 32. In this embodiment, the wind guide paths RT2 guide the traveling wind to the rear side of the front cowl 3, thereby suppressing negative pressure generation behind the front cowl 3 upon driving and also reducing the driving resistance generated by the traveling wind. Each wind guide path RT2 has an opening OP as an inlet. The opening OP extends in a slit shape in the vehicle width direction along the concave shape of the upper portion of the headlight unit 2. More specifically, in this embodiment, the wind guide path RT2 is formed for each of the left and right lens portions 21R and 21L. The openings OP extend in the vehicle width direction along upper portions UP of the lens portions 21L and 21R. Hence, the traveling wind and flowing upward on the lens portions 21L and 21R can be guided to the rear side of the front cowl 3.

Figures 7A, 7B:
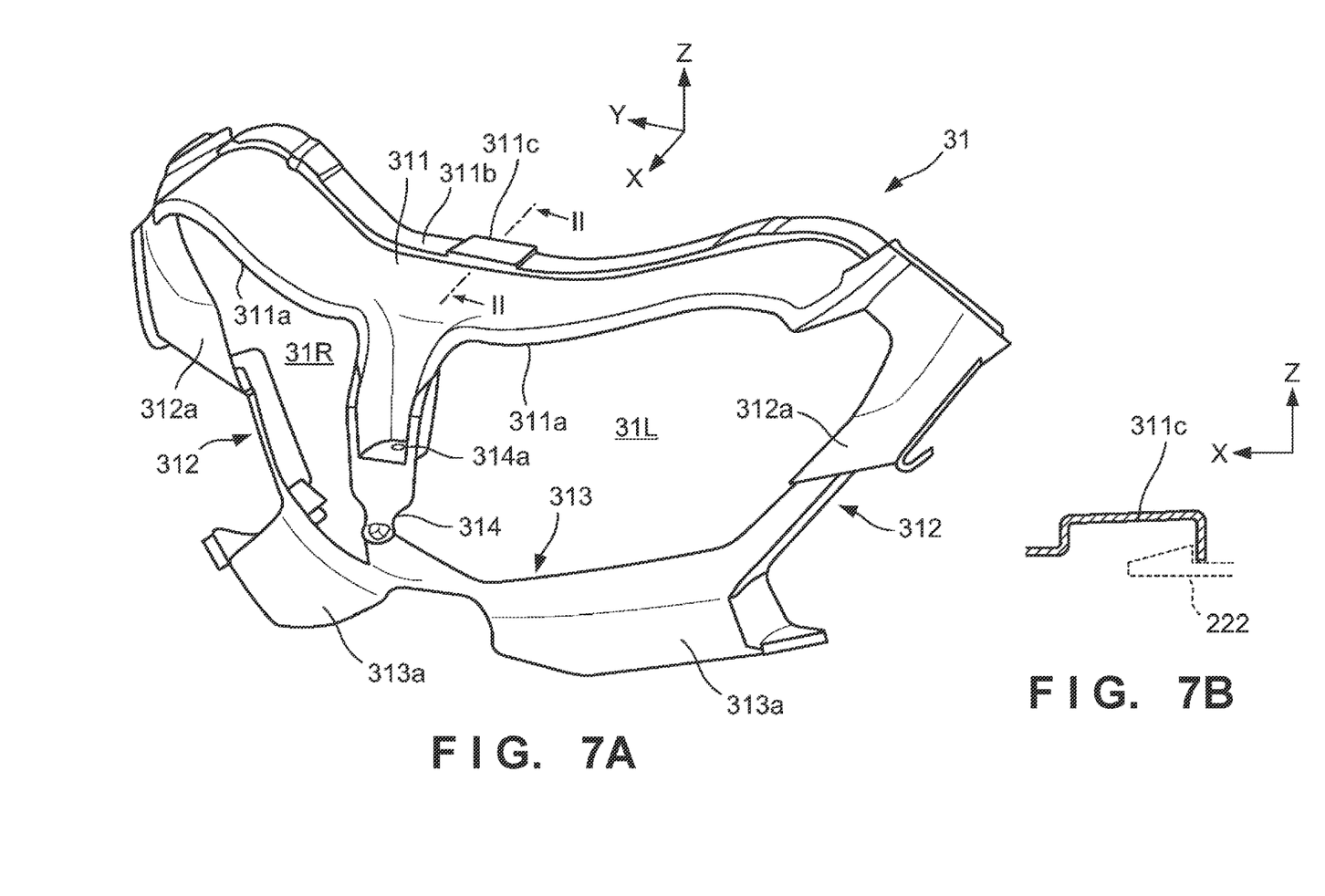
FIG. 7A is a perspective view of an annular cowl.
FIG. 7B is a sectional view taken along a line II-II in FIG. 7A.

The arrangements of the annular cowl 31, a lens unit 8, and the upper cowl 32 will be described next. The arrangement of the annular cowl 31 will be described first with reference to FIGS. 7A and 7B. FIG. 7A is a perspective view of the annular cowl 31. FIG. 7B is a sectional view taken along a line II-II in FIG. 7A.

The annular cowl 31 is a frame body including opening portions 31L and 31R corresponding to the left and right lens portions 21L and 21R, and includes an upper wall 311, left and right side walls 312, a lower wall 313, and an intermediate wall 314, which define the opening portions 31L and 31R. The annular cowl 31 is integrally formed from, for example, a resin material. The upper wall 311 is a strip-shaped portion extending in the vehicle width direction. A front edge portion 311a obliquely bent forward is formed on the front side, and a rear edge portion 311b clamped by the headlight unit 2 is formed on the rear side. An engaging portion 311c is formed at the center of the rear edge portion 311b. As shown in FIG. 7B, the engaging portion 311c has a C-shaped section opening downward and is configured to engage with a pawl-shaped engaging portion 222 provided on the headlight unit 2.

The side walls 312 connect the ends of the upper wall 311 and the lower wall 313 in the vehicle width direction and extend obliquely in the vertical direction. The partition wall 312a is integrally formed on each side wall 312. The partition wall 312a extends from the front side to the rear side in the vehicle longitudinal direction while tilting upward and extends from inside to outside in the vehicle width direction while tilting.

The lower wall 313 is a portion extending in the vehicle width direction. A pair of left and right spoiler portions 313a are integrally formed on the lower wall 313. Each spoiler portion 313a projects forward and extends in a strip shape in the vehicle width direction.

The intermediate wall 314 is a portion that connects the upper wall 311 and the lower wall 313 and divides the opening portions 31L and 31R on the left and right sides. The intermediate wall 314 connects the upper wall 311 and the lower wall 313, thereby increasing the rigidity of the annular cowl 31. The upper portion of the intermediate wall 314 includes a portion formed into a rack shape. A connecting portion 314a that connects the annular cowl 31 and the headlight unit 2 is formed in this portion. In this embodiment, the connecting portion 314a is a vertical hole. The arrangement of the connecting portion 314a can be selected in accordance with the connecting structure between the annular cowl 31 and the headlight unit 2.

Figure 8A:
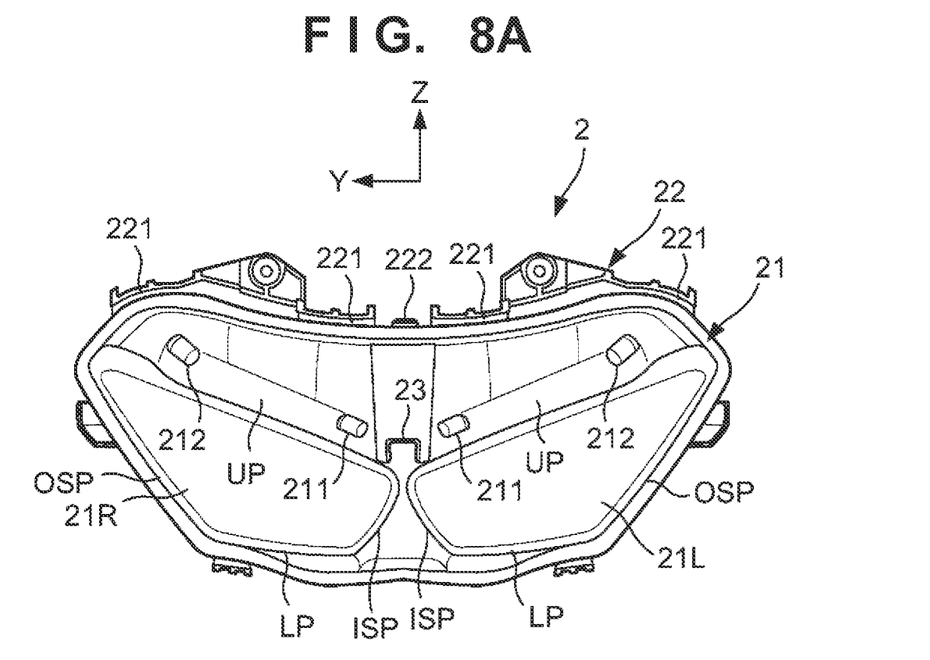
FIG. 8A is a front view of a headlight unit.
Figure 8B:
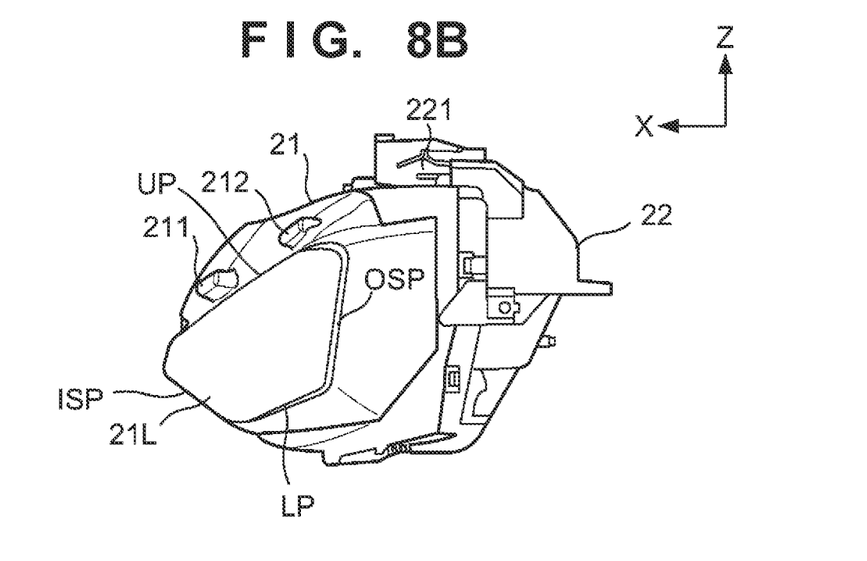
FIG. 8B is a side view of the headlight unit.
Figure 9A:
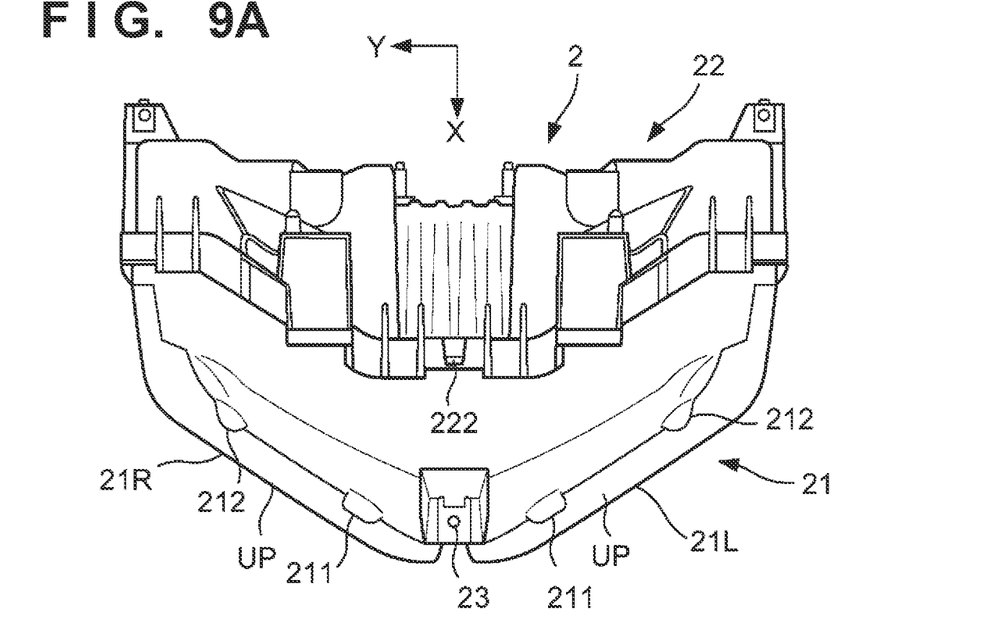
FIG. 9A is a plan view of the headlight unit shown in FIG. 8A.

The arrangement of the headlight unit 2 will be described next with reference to FIGS. 8A, 8B, and 9A. FIG. 8A is a front view of the headlight unit 2. FIG. 8B is a left side view of the headlight unit 2. FIG. 9A is a plan view of the headlight unit 2.

The headlight unit 2 is an almost bilaterally symmetrical unit and is roughly divided into a transparent portion 21 on the front side and a main body portion 22 on the rear side. The main body portion 22 includes, for example, a light source such as an LED, a reflector, and a case that stores them. A slit 221 in which the upper wall 311 of the annular cowl 31 is inserted is formed in the upper portion of the main body portion 22. In addition, the engaging portion 222 indicated by a broken line in FIG. 7B is disposed at the center of the upper portion of the main body portion 22. The engaging portion 222 is an elastic piece that extends forward and has the rear portion integrally connected to the case. When the upper wall 311 is inserted into the slit 221, and engaging portion 222 engages with the engaging portion 311c, the upper wall 311 is clamped by the main body portion 22 in the slit 221. In addition, when the engaging portion 222 engages with the engaging portion 311c, the annular cowl 31 is prevented from dropping off from the headlight unit 2 to the front side.

The transparent portion 21 is integrally formed from, for example, a transparent resin material. On the front side, the lens portions 21L and 21R are formed to project to the left and right sides. The lens portions 21L and 21R are portions that pass light from the light source of the main body portion 22 and project it to the front side of the vehicle 100.

In this embodiment, each of the lens portions 21R and 21L has a rectangular shape that looks like an eye turned up at the corner, and has an outline formed from the upper portion UP, side portions OSP and ISP, and a lower portion LP. The upper portion UP tilts upward from inside to outside in the vehicle width direction. The side portion OSP is located outside in the vehicle width direction, and the side portion ISP is located inside in the vehicle width direction. The side portion OSP tilts upward from inside to outside in the vehicle width direction. The side portion ISP tilts upward from outside to inside in the vehicle width direction. The lower portion LP tilts upward from inside to outside in the vehicle width direction, but the tilt is close to horizontal as compared to the upper portion UP.

Convex portions 211 and 212 are formed behind each upper portion UP. The convex portions 211 and 212 are portions that form the wind guide path RT2 and regulate the flowing direction of the traveling wind that enters from the opening OP. In this embodiment, the convex portions 211 and 212 are arranged separately in the vehicle width direction, thereby guiding the vehicle width direction that enters from the opening OP to the rear side and also regulating the flow to the sides.

A rack-shaped portion is formed between the lens portion 21R and the lens portion 21L. A connecting portion 23 corresponding to the connecting portion 314a of the annular cowl 31 is formed in this portion. In this embodiment, the connecting portion 23 is a screw hole. A bolt V (see FIG. 4) is inserted into the connecting portion 314a and screwed into the connecting portion 23, thereby fixing the annular cowl 31 to the headlight unit 2. As described above, in this embodiment, the annular cowl 31 is assembled to the headlight unit 2 at the two points by clamping of the upper wall 311 in the slit 221 and connection by the connecting portions 23 and 314a. This makes it possible to fix the two members at a smaller number of assembly points. In particular, a point fastened by a bolt is set to one point at the center of the annular cowl 31 and the headlight unit 2 in the vehicle width direction. This makes it possible to fix the two members without an imbalance at a small number of fastening points.

Figure 10A:
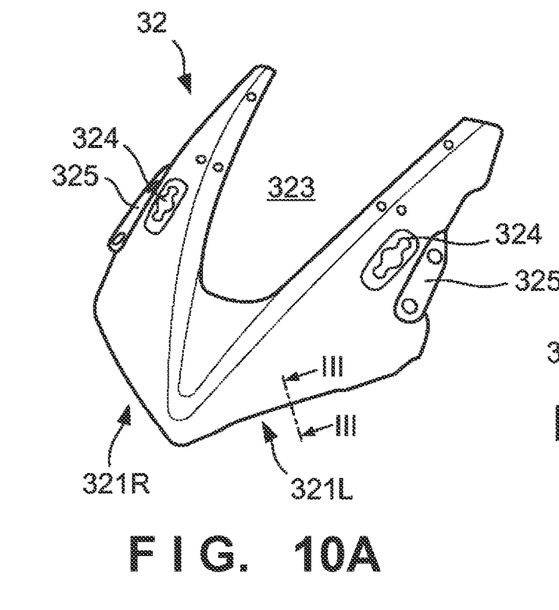
FIG. 10A is a perspective view of an upper cowl.
Figure 10B:
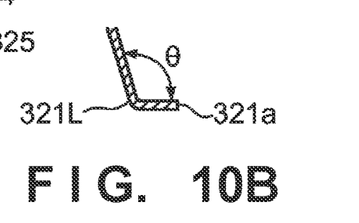
FIG. 10B is a sectional view taken along a line III-III in FIG. 10A.
Figure 10C:
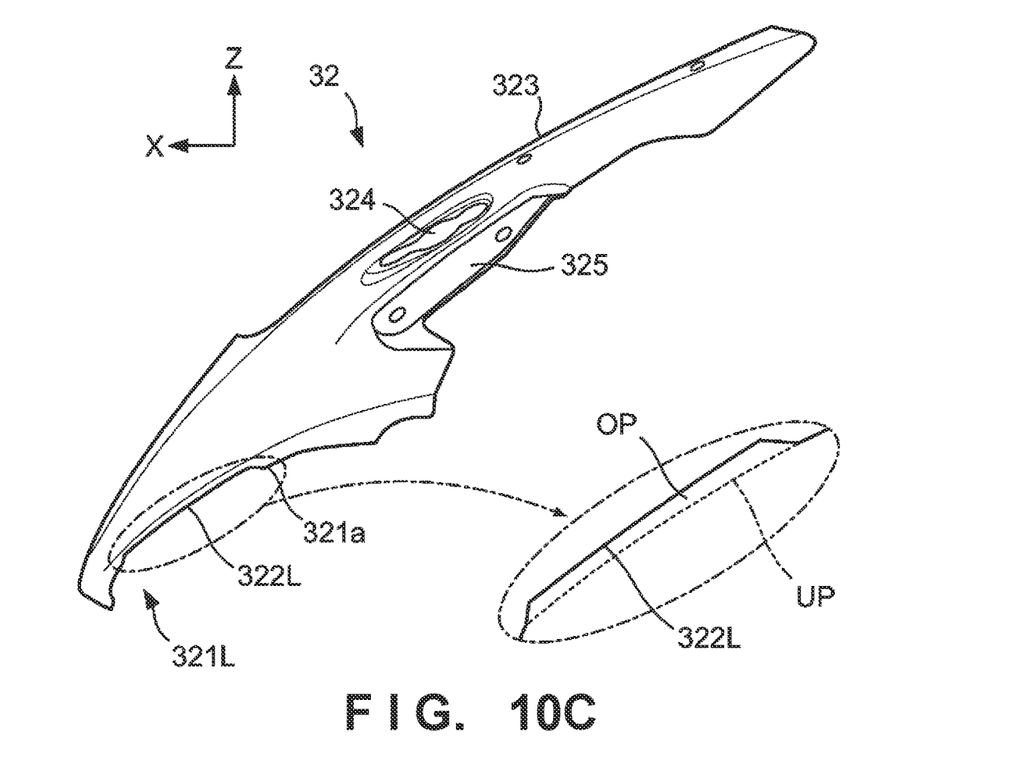
FIG. 10C shows a side view and a partially enlarged view of the upper cowl.

The arrangement of the upper cowl 32 will be described next with reference to FIGS. 10A to 10C. FIG. 10A is a perspective view of the upper cowl 32. FIG. 10B is a sectional view taken along a line III-III in FIG. 10A. FIG. 10C shows a side view and a partially enlarged view of the upper cowl 32.

The upper cowl 32 is a shell-like panel member and has a bilaterally symmetrical V shape as a whole in the front view of the vehicle. A notch 323 opening upward in which the wind screen 33 is mounted is formed on the upper side of the upper cowl 32. Attachment portions 324 of the side mirrors 6 and attachment portions 325 of the side panels 4 are arranged on the sides of the notch 323.

The upper cowl 32 includes a left edge portion 321L and a right edge portion 321R on the front side. In the front view of the vehicle, the edge portions 321L and 321R tilt upward from inside to outside in the vehicle width direction. The arrangement of the edge portion 321L will further be described with reference to FIGS. 10B and 10C.

As shown in FIG. 10B, the end of the edge portion 321L is bent. An angle θ of the bent portion can be selected from the range of, for example, 90° to 120°, and is, for example, 100°. When the end of the edge portion 321L is bent, the rigidity of the edge portion 321L can be improved, and a deformation by the pressure of the traveling wind can be suppressed. An end face 321a of the edge portion 321L abuts against the upper portion UP of the lens portion 21L. In a partial section, a concave portion 322L is formed, as shown FIG. 10C. In the concave portion 322L, a gap is formed between the edge portion 321L and the upper portion UP, thereby forming the opening OP. The edge portion 321R has the same arrangement as the edge portion 321L, and a concave portion 322R is formed (see FIG. 3).

Figure 4:
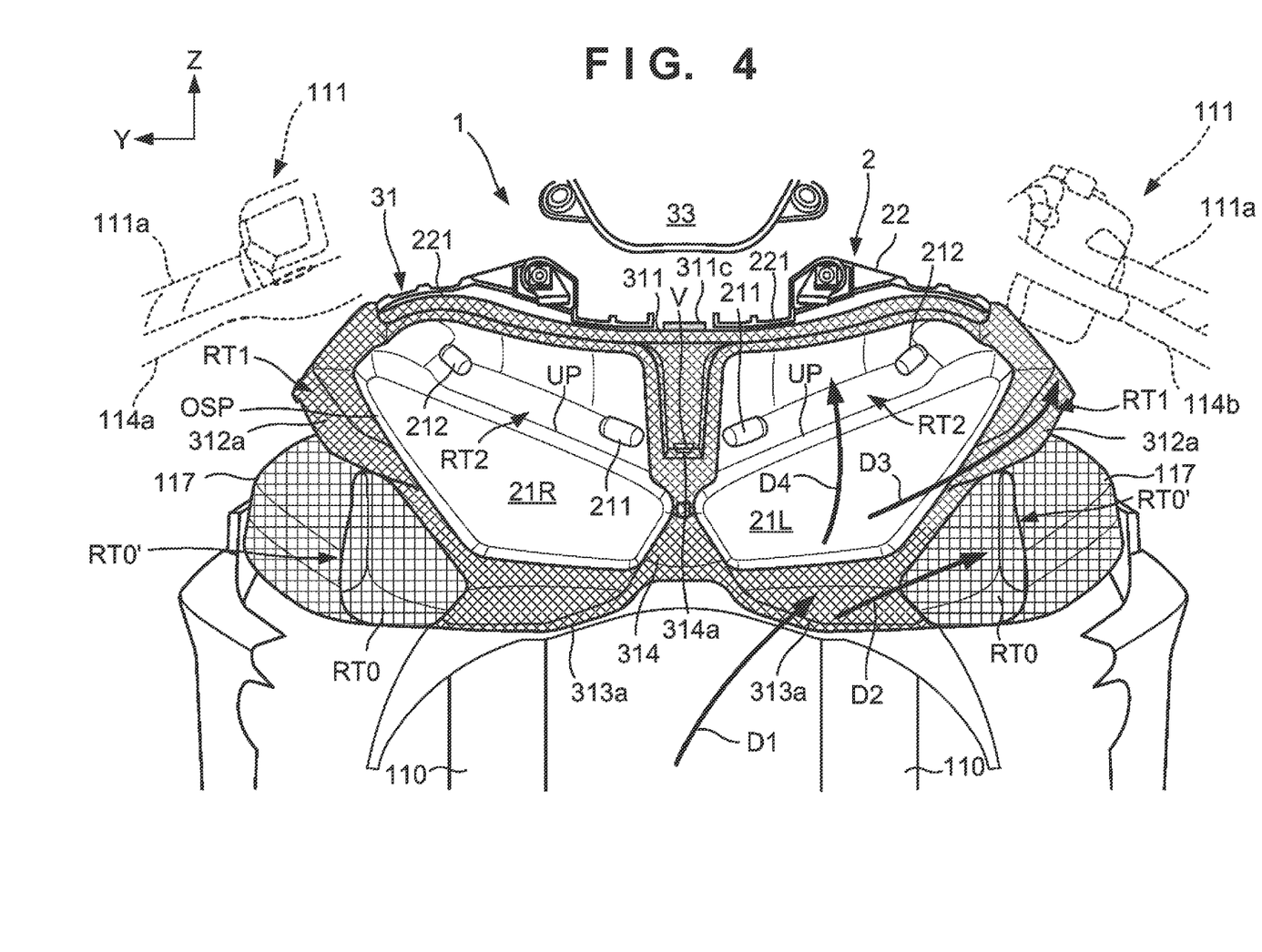
FIG. 4 is an exploded view showing the vicinity of the headlight of the vehicle shown in FIG. 1.
Figure 5:
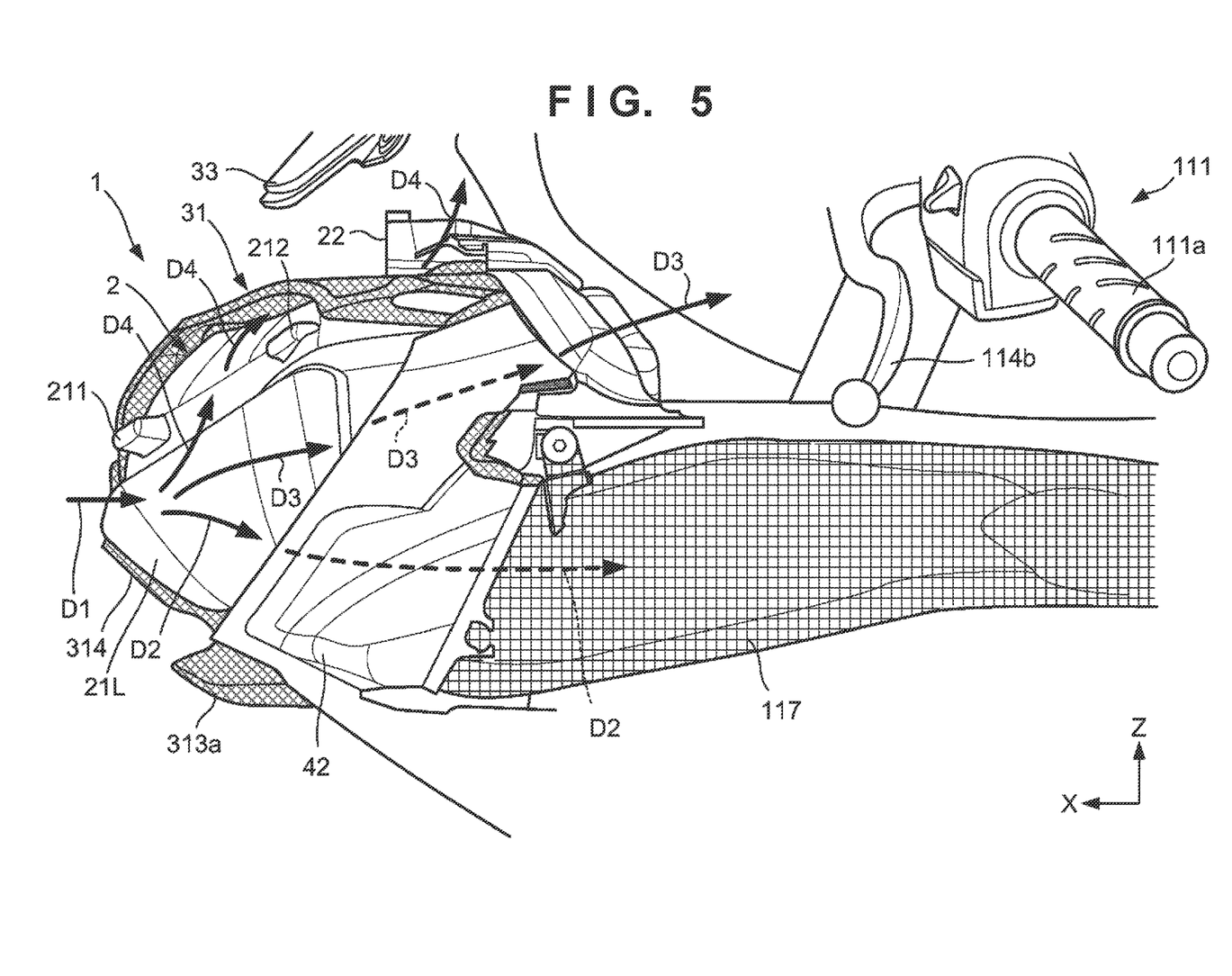
FIG. 5 is an exploded view showing the vicinity of the headlight of the vehicle shown in FIG. 1.
Figure 6:
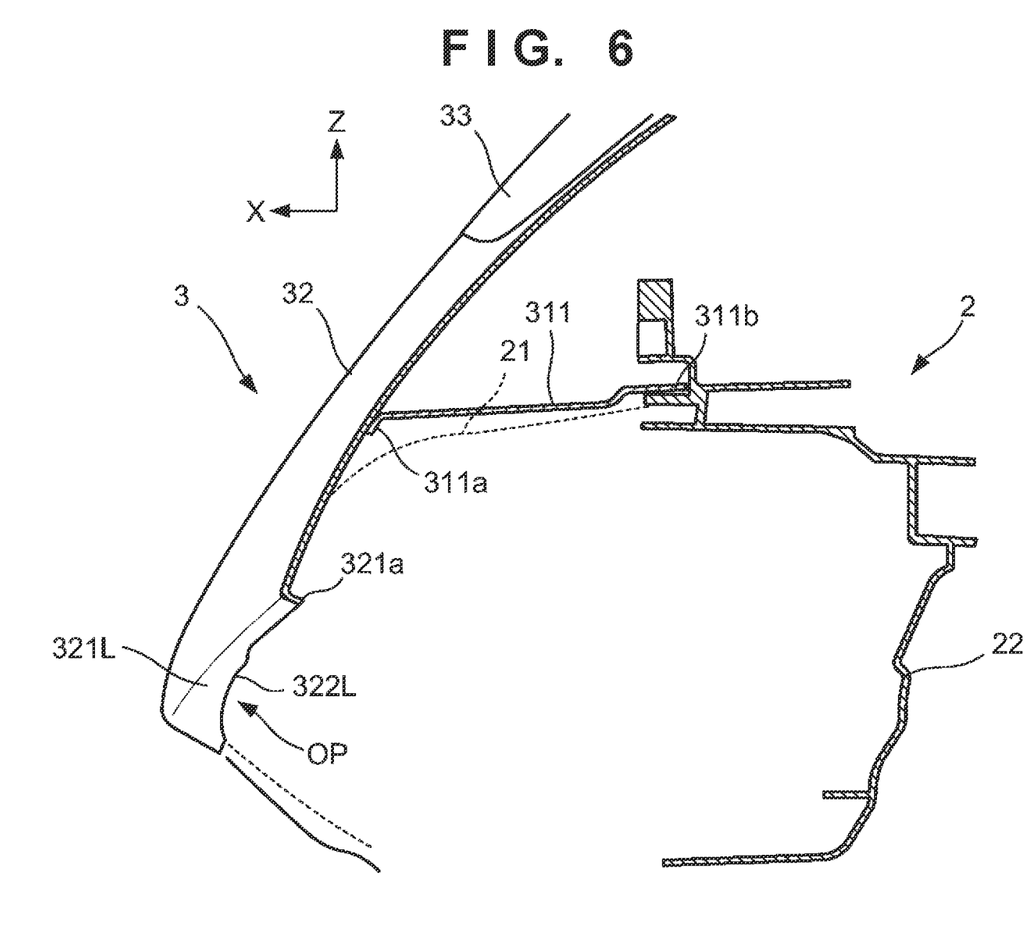
FIG. 6 is a sectional view taken along a line I-I in FIG. 3.

The structure and function of the front structure 1 will further be described next with reference to FIGS. 3 to 6. FIG. 4 is a front view of the front structure 1, which shows a state in which the upper cowl 32 is removed. FIG. 5 is a left side view of the front structure 1, which shows a state in which the outer panel 41 and the upper cowl 32 are removed. FIG. 6 is a sectional view taken along a line I-I in FIG. 3 in which the internal structure and the like are not illustrated. In FIG. 4, several parts (the annular member 31 and the air intake ducts 117) are hatched for the purpose of clearly showing the boundaries to other parts, like FIG. 3.

Referring to FIGS. 3 and 4, in the front view of the vehicle, when the lens portions 21L and 21R are inserted into the opening portions 31L and 31R, the annular cowl 31 is arranged to surround the lens portions 21L and 21R. The side walls 312 and the lower wall 313 are arranged along the lower portion LP and the side portions OSP, and the intermediate wall 314 passes between the lens portions 21L and 21R. In this way, the lens portions 21L and 21R are rimmed with the annular cowl 31 except the upper portions UP.

The upper cowl 32 is arranged to cover the upper portion (here, the upper wall 311 and part of the side walls 312) of the annular cowl 31 from the front side. The edge portions 321L and 321R of the upper cowl 32 abut against the upper portions UP of the lens portions 21L and 21R while forming the openings OP, thereby rimming the upper portions UP.

The annular cowl 31 may have a color (for example, gray or black) whose lightness is lower than that of the upper cowl 32 or middle cowls 4, thereby the annular cowl 31 becomes visually unnoticeable, and the outlines of the lens portions 21L and 21R clearly emerge. In addition, the annular cowl 31 is unnoticeable and the upper cowl 32 and the wind screen 33 are visually emphasized, thereby the front cowl 3 can be shown small, and a sharp visual impression can be given.

The left and right partition walls 312a are located outside the lens portions 21L and 21R in the vehicle width direction. The ends of the air intake ducts 117 open to the inlets RT0' of the air intake path RT0. The air intake duct 117 is a hollow member that forms the air intake path RT0 and extends to the air cleaner box 105.

The spoiler portions 313a project forward from the lower portion of the headlight unit 2 and, more specifically, from the lower portions LP of the lens portions 21L and 21R and extend outward in the vehicle width direction toward the inlets RT0'(in other words, the openings of the air intake ducts 117) of the air intake path RT0. It is therefore possible to not only obtain a downforce in the front portion of the vehicle 100 at the time of driving but also generate an airflow from the spoiler portions 313a to the air intake ducts 117 and ensure the air take amount. Especially, the wind at a relatively high speed, which is caused by driving at the center of the vehicle, can be guided from the spoiler portions 313a to the air intake ducts 117, and the air intake amount can be ensured. The partition walls 312a and the spoiler portions 313a are provided on the annular cowl 31 to impart multiple functions to the annular cowl 31. At the same time, since the annular cowl 31 is a frame body, the annular cowl 31 wholly resists against the pressure of the traveling wind, and a local deformation such as twist can be prevented.

The flow of the traveling wind will be described with reference to FIGS. 3 to 5. An airflow D1 that flows to the front structure 1 at the time of driving diffuses outward in the vehicle width direction or upward in the vertical direction by the interference with the lens portions 21L and 21R and the guide of the spoiler portions 313a. Each airflow flowing outward in the vehicle width direction is divided to airflows on the upper and lower sides by the action of the partition wall 312a. An airflow D2 on the lower side is introduced to the air intake duct 117 that forms the air intake path RT0 and guided to the air cleaner box 105.

An airflow D3 on the upper side is guided to the rear side of the front cowl 3 through the wind guide path RT1 formed between the side wall 312 of the annular cowl 31 and the inner panel 42 of the middle cowl 4. This can suppress negative pressure generation behind the front cowl 3. Since the wind guide paths RT1 are formed in the upper regions of the air intake portions 5R and 5L, the traveling wind can easily be guided to the rear side of, in particular, the upper portion of the front cowl 3, and negative pressure generation behind the front cowl 3 can be suppressed.

In addition, intake sound generated near the inlets RT0' of the air intake path RT0 is readily carried to the rider by the traveling wind, which flows through the wind guide paths RT1. Hence, the rider can experience the real feeling of engine drive by the intake sound while recognizing the air intake state of the engine 104a. The wind guide paths RT1 or air intake paths RT0 are provided in pair on the left and right sides. Hence, the rider can hear the intake sound by the left and right ears and can further experience the real feeling.

The pressure of the traveling wind acts on the partition walls 312a or the spoiler portions 313a. The connecting portion 314a is arranged on the intermediate wall 314 passing between the lens portions 21L and 21R, and the annular cowl 31 and the headlight unit 2 are fastened here by the bolt V. It is therefore possible to maintain the clearance between the annular cowl 31 and the lens portions 21L and 21R throughout against the pressure of the traveling wind by the small number of connecting portions.

In this embodiment, each of the air intake portions 5R and 5L is divided into upper and lower portions by the partition wall 312a, thereby forming the inlets of the air intake path RT0 and the wind guide path RT1. Hence, it is possible to form these members by a relatively simple structure while decreasing the number of parts as compared to a case in which completely independent inlets or paths are formed.

An airflow D4 flowing upward in the vertical direction is guided to the rear side through the wind guide path RT2 formed by the opening OP and the convex portions 211 and 212, and guided from the gap between the annular cowl 31 and the headlight unit 2 and the like to the rear side of the front cowl 3. When the wind guide paths RT2 are provided in addition to the wind guide paths RT1 to easily make the traveling wind pass through to the rear side, the air resistance can be reduced independently of the driving posture of the vehicle 100. In particular, for example, if the vehicle 100 leans to turn, the amount of air that passes through the wind guide path RT1 located near the road surface may decrease. However, since the wind guide path RT2 is located at the center of the vehicle, the traveling wind can be discharged without an influence of the driving posture of the vehicle 100, and the air resistance can be reduced.

Figure 9B:
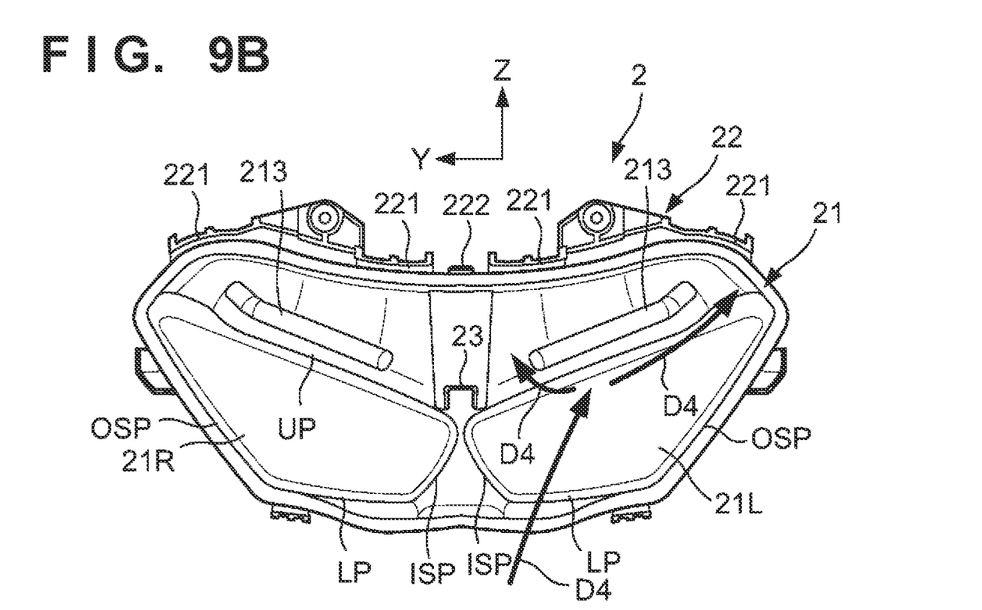
FIG. 9B is a front view of a headlight unit according to another example.

Note that by the arrangement of the convex portions 211 and 212, the direction to guide the airflow can be changed. For example, as shown in FIG. 9B, if a convex portion 213 extending in the vehicle width direction in the upper portion UP is employed in place of the convex portions 211 and 212, the airflow D4 can be guided in the vehicle width direction. In this case as well, it is possible to suppress negative pressure generation behind the front cowl 3 by making the airflow diffract from the side to the rear side of the front cowl 3 while reducing the air resistance.

All the convex portions 211 to 213 are hidden behind the upper cowl 32. Hence, the wind guide direction can be adjusted without spoiling the outer appearance.

Referring to FIG. 6, the upper wall 311 of the annular cowl 31 extends backward from the rear portion of the upper cowl 32 at a position between the opening OP and the wind screen 33 in the vertical direction. With this arrangement, the upper portions of the lens portions 21L and 21R are surrounded by the upper cowl 32 and the upper wall 311. The upper wall 311 serves as a light-shielding wall, thereby preventing light from the lens portions 21L and 21R from leaking to the wind screen 33. Since the upper wall 311 functioning as the light-shielding wall is formed as part of the annular cowl 31, it is possible to decrease the number of parts, increase the strength, and suppress light leakage from a gap generated with respect to the upper cowl 32 by a vibration during driving.

The front edge portion 311a of the upper wall 311 extends downward along the rear surface of the upper cowl 32 while abutting against the rear surface of the upper cowl 32. A sponge or the like may intervene between the front edge portion 311a and the upper cowl 32. However, since the front edge portion 311a extends along the rear surface of the upper cowl 32, a light-shielding effect can be obtained without a sponge.

<Summary of Embodiment>

1. A front structure of a saddle ride type vehicle according to the embodiment is a front structure (1) of a saddle ride type vehicle (100) comprising:
    a headlight unit (2);
    a front cowl (3) including a portion configured to surround the headlight unit (2) in a front view of the vehicle; and
    a middle cowl (4) configured to cover a side of the headlight unit (2),
    wherein at a position outside the headlight unit (2) in a vehicle width direction, an air intake portion (5R, 5L) opening to a front side of the vehicle is formed between the front cowl (3) and the middle cowl (4),
    the front cowl (3) comprises a partition wall (312a) configured to divide the air intake portion (5R, 5L) into an upper region and a lower region,
    the lower region forms an inlet (RT0') of an air intake path (RT0) of an air cleaner, and
    the upper region forms a first wind guide path (RT1) configured to discharge a traveling wind to a rear side of the front cowl (3).

According to the embodiment, the air intake portion is divided into the upper and lower regions by the partition wall, thereby forming the inkjet of the air intake path and the first wind guide path by a relatively simple structure. Since the first wind guide path is formed in the upper region of the air intake portion, the traveling wind can easily be guided to the rear side of, in particular, the upper portion of the front cowl, and negative pressure generation behind the front cowl can be suppressed. In addition, intake sound generated at the inlet of the air intake path is guided to the rear side where the rider exists by the traveling wind, which passes through the first wind guide path. Hence, the rider can experience the real feeling of engine drive by the intake sound while recognizing the air intake state of the engine.

2. In the front structure of the saddle ride type vehicle according to the embodiment,
    each side portion (OSP) outside the headlight unit (2) in the vehicle width direction tilts upward toward outside, and
    the partition wall (312a) is disposed outside each side portion (OSP) so as to form a pair of inlets (RT0') and a pair of first wind guide paths (RT1).

According to the embodiment, the inlets of air intake paths and the first wind guide paths are provided in pairs on the left and right sides. It is therefore possible to further experience the real feeling of engine drive by guiding the intake sound from the left and right sides to the rider while ensuring the air intake amount.

3. In the front structure of the saddle ride type vehicle according to the embodiment,
    the first wind guide path (RT1) includes a portion included in a width in a height direction of left and right handle grips in a front view of the vehicle, and is located close to a center of the vehicle in the vehicle width direction with respect to the left and right handle grips.

According to the embodiment, the protection performance of the front cowl is increased by handle components, and the traveling wind, which is discharged from the first wind guide path, is guided to a portion closer to the rider. This allows the intake sound to readily reach the rider, and can further experience the real feeling of engine drive.

4. In the front structure of the saddle ride type vehicle according to the embodiment,
    the front cowl (3) comprises a spoiler portion (313a), and
    the spoiler portion (313a) projects frontward from a lower portion of the headlight unit (2) and extends outward in the vehicle width direction toward the inlet (RT0').

According to the embodiment, it is possible to ensure the air take amount by guiding the traveling wind, which has a relatively high flow velocity at the center of the vehicle, to the air intake path while obtaining a downforce in the front portion of the vehicle.

5. In the front structure of the saddle ride type vehicle according to the embodiment,
    the middle cowl (4) is a member separated from the front cowl (3).

According to the embodiment, it is possible to form a wind guide path by a relatively simple structure while separating the front cowl and the middle cowl to make compact molds used to form the parts.

6. In the front structure of the saddle ride type vehicle according to the embodiment,
    the front cowl (3) forms a second wind guide path (RT2) having an opening (OP) extending in the vehicle width direction along an upper portion (UP) of the headlight unit (2).

According to the embodiment, the second wind guide path close to the center of the vehicle is provided in addition to the first wind guide path located outside in the vehicle width direction, thereby reducing the driving resistance when the vehicle leans to turn.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-060892, filed Mar. 24, 2016 which is hereby incorporated by reference herein in its entirety.

What is claimed is:

1. A front structure of a saddle ride type vehicle, comprising:
a headlight unit;
a front cowl including a portion configured to surround the headlight unit in a front view of the vehicle; and
a middle cowl configured to cover a side of the headlight unit,
wherein at a position outside the headlight unit in a vehicle width direction, an air intake portion opening to a front side of the vehicle is formed between the front cowl and the middle cowl,
the front cowl comprises a partition wall configured to divide the air intake portion into an upper region and a lower region,
the lower region forms an inlet of an air intake path of an air cleaner, and
the upper region forms a first wind guide path configured to discharge a traveling wind to a rear side of the front cowl.

2. The front structure of the saddle ride type vehicle according to claim 1, wherein each side portion outside the headlight unit in the vehicle width direction tilts upward toward outside, and
the partition wall is disposed outside each side portion so as to form a pair of inlets and a pair of first wind guide paths.

3. The front structure of the saddle ride type vehicle according to claim 2, wherein the first wind guide path includes a portion included in a width in a height direction of left and right handle grips in the front view of the vehicle, and is located substantially along the vehicle centerline in a length direction a center of the vehicle in the vehicle width direction with respect to the left and right handle grips.

4. The front structure of the saddle ride type vehicle according to claim 1, wherein the front cowl comprises a spoiler portion, and
the spoiler portion projects frontward from a lower portion of the headlight unit and extends outward in the vehicle width direction toward the inlet.

5. The front structure of the saddle ride type vehicle according to claim 1, wherein the middle cowl is a member separated from the front cowl.

6. The front structure of the saddle ride type vehicle according to claim 1, wherein the front cowl forms a second wind guide path having an opening extending in the vehicle width direction along an upper portion of the headlight unit.

* * * * *